United States Patent [19]

Giles et al.

[11] 4,264,566
[45] Apr. 28, 1981

[54] TEMPERATURE CONTROL FOR AN AMMONIA SYNTHESIS REACTOR

[75] Inventors: Richard F. Giles, Pinch, W. Va.; Larry D. Gaines, Bartlesville, Okla.

[73] Assignee: Phillips Petroleum Company, Bartlesville, Okla.

[21] Appl. No.: 949,290

[22] Filed: Oct. 6, 1978

[51] Int. Cl.³ .............................................. C01C 1/04
[52] U.S. Cl. ................................ 423/359; 23/230 A; 422/109; 422/148; 422/190; 423/361; 423/DIG. 5
[58] Field of Search ............... 423/359, 360, 361, 362, 423/363, DIG. 5; 23/230 A; 422/109, 148, 190

[56] References Cited

U.S. PATENT DOCUMENTS

| | | | |
|---|---|---|---|
| 3,031,267 | 4/1962 | Martin et al. | 423/360 |
| 3,254,967 | 6/1966 | Wentworth | 423/361 |
| 3,656,911 | 4/1972 | Hobbs | 422/62 |
| 4,088,740 | 5/1978 | Gaines | 423/359 |
| 4,094,959 | 6/1978 | Ball et al. | 423/359 |

OTHER PUBLICATIONS

Shaw, Manesh J., "Control Simulation in Ammonia Production," Industrial and Engineering Chemistry, vol. 59, No. 1, pp. 72-83, Jan. 1967.

Primary Examiner—O. R. Vertiz
Assistant Examiner—Wayne A. Langel

[57] ABSTRACT

Control of the temperature of an ammonia synthesis reactor is accomplished so as to reduce temperature oscillations throughout the reactor. This allows the ammonia synthesis reactor to be operated close to the lowest stable operating temperature which results in optimal reactor performance. The temperature of the effluent flowing from the ammonia synthesis reactor is monitored to detect the presence of thermal waves. The temperature of the effluent flowing from the synthesis reactor is utilized to generate a correction term which is utilized in temperature control for the ammonia synthesis reactor to stabilize the operation of the ammonia synthesis reactor.

20 Claims, 2 Drawing Figures

TEMPERATURE CONTROL FOR AN AMMONIA SYNTHESIS REACTOR

This invention relates to control of an ammonia synthesis process. In a specific aspect this invention relates to method and apparatus for controlling thermal oscillations in a quench type ammonia synthesis reactor.

A quench type ammonia synthesis reactor is often used in ammonia synthesis processes. The temperature profile across the quench type reactor is controlled by introducing cold feed gas into quench zones in the ammonia synthesis reactor. It is well known that in quench type ammonia synthesis reactors the optimal reactor performance is obtained slightly above the lowest stable operating temperature for the reactor.

It is desirable to operate the ammonia synthesis reactor close to the lowest stable operating temperature but this requires close control of the temperature profile across the ammonia synthesis reactor to prevent a blowout (quenching of the ammonia reaction) from occurring. A blowout will occur if the temperature of the ammonia synthesis reactor goes below the lowest stable operating temperature. Previous control systems have attempted to provide this close control of the ammonia synthesis reactor by measuring the temperature in the quench zones of the ammonia synthesis reactor and comparing this measured temperature with a set point temperature representative of the desired temperature in the quench zones of the ammonia synthesis reactor. The comparison was utilized to control all of the flows of quench fluid to the quench zones to thereby control the temperature profile across the ammonia synthesis reactor.

It has been found that quench type ammonia synthesis reactors have a tendency to exhibit large sustained temperature oscillations in the region of optimal operation. The frequency of these oscillations for the ammonia synthesis reactor is such that they are not detected by the conventional temperature measurement system which is utilized to measure the temperature in the quench zones of the ammonia synthesis reactor. This lack of detection is due to the lag time associated with the measurements of the temperature in the quench zones of the ammonia synthesis reactor. Because of the high operating pressures of the ammonia synthesis reactor and the associated wall thickness which is necessary to withstand the high operating pressure and other similar factors the temperature measurements for the quench zones of an ammonia synthesis reactor have been found experimentally to have an associated lag time of approximately 10 minutes. These measurements were taken from a commercial ammonia synthesis process. While the lag time associated with the temperature measurements of the quench zones of the ammonia synthesis reactor may vary with different plants there will almost always be some time lag present using conventional measurement equipment due to the construction of the ammonia synthesis reactor.

The frequency of the temperature oscillations through the ammonia synthesis reactor is such that the temperature oscillations are generally not detected by conventional temperature measurements control systems which have time lags associated therewith. Large temperature oscillations may pass through the converter with little or no control action being generated. Operation near blowout conditions for an ammonia synthesis reactor where temperature oscillations are present would be feasible only if the temperature profile of the ammonia synthesis reactor could be stabilized.

It is thus an object of this invention to provide method and apparatus for controlling thermal oscillations in a quench type ammonia synthesis reactor.

In accordance with the present invention, method and apparatus is provided whereby the temperature of the effluent flowing from the ammonia synthesis reactor is utilized to generate a correction term which is utilized in a temperature control system to reduce temperature oscillations and thereby stabilize the operation of the ammonia synthesis reactor. The ammonia synthesis reactor can thus be operated near the lowest stable operating temperature which results in optimal reactor performance.

The measurement of the temperature of the effluent flowing from the ammonia synthesis reactor is available with a very minimal measurement time lag. The measurement signal is delayed or shifted in phase so as to be approximately 180 degrees out of phase with the measurement signal at oscillation frequencies close to that of the thermal waves propagating through the ammonia synthesis reactor. The phase shifted temperature measurement signal can be subtracted from the current measurement of the temperature of the effluent flowing from the ammonia synthesis reactor to yield a correction term which can be utilized to stabilize the operation of the ammonia synthesis reactor. The correction term is provided to the temperature control system to thereby modify the settings of the control valves controlling the flows of the quench fluid to the quench zones of the ammonia synthesis reactor. In this manner the temperature of the ammonia synthesis reactor can be closely controlled which allows operation near the lowest stable operating temperature for the ammonia synthesis reactor which results in optimal reactor performance.

Other objects and advantages of the invention will be apparent from the description of the invention and the appended claims as well as from the detailed description of the drawings in which:

The invention is illustrated and described in terms of a typical ammonia synthesis process and a typical ammonia synthesis reactor. The invention, however, is applicable to any ammonia synthesis process wherein a quench type ammonia synthesis reactor is utilized. The invention is also applicable to different designs for a quench type ammonia synthesis reactor.

Figure 2:
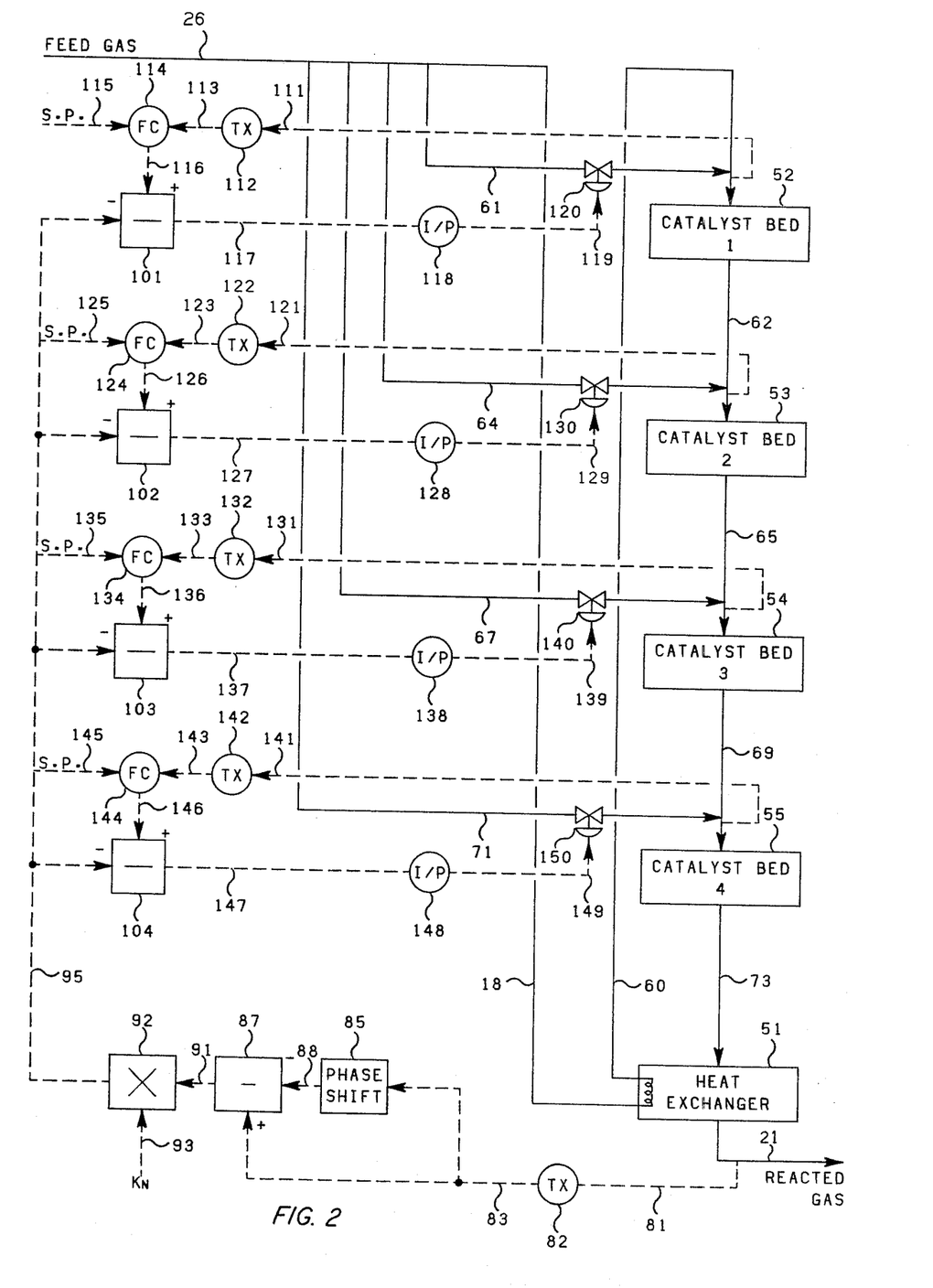
FIG. 2 is a simplified representation of a quench type ammonia synthesis reactor together with the control system of the present invention for controlling the temperature profile across the ammonia synthesis reactor.

The invention is illustrated in terms of a preferred control system configuration. However, the invention also extends to different types of control system configurations which accomplish the purpose of the invention. Lines designated as signal lines in FIG. 2 are electrical in this preferred embodiment except for the signal lines provided from the current to pressure transducers to the control valves located in the quench fluid lines. However, the invention is also applicable to pneumatic, mechanical, hydraulic or other signal means for transmitting information. In almost all control systems, some combination of these types of signals will be used. However, use of any other type of signal transmission, compatible with the process and equipment in use, is within the scope of the invention.

Controllers shown may utilize the various modes of control such as proportional, proportional-integral, proportional-derivative, or proportional-integral-derivative. In this preferred embodiment proportional-integral controllers are utilized. The operation of these types of controllers is well known in the art. The output control signal of a proportional-integral controller may be represented as $$S = K_1 E + K_2 \int E \, dt$$

where

S = output control signal;
E = difference between two input signals; and
$K_1$ and $K_2$ = constants.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention utilizes a combination of pneumatic control elements such as a pneumatically operated valve means 120 in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, some measurement systems may produce a measurement signal which exhibits a generally proportional relationship to the square of the measured parameter. Other measuring systems might produce a signal which is proportional to the measure parameter, and still other measuring systems may produce a signal which bears a more complicated, but known relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measure parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Figure 1:
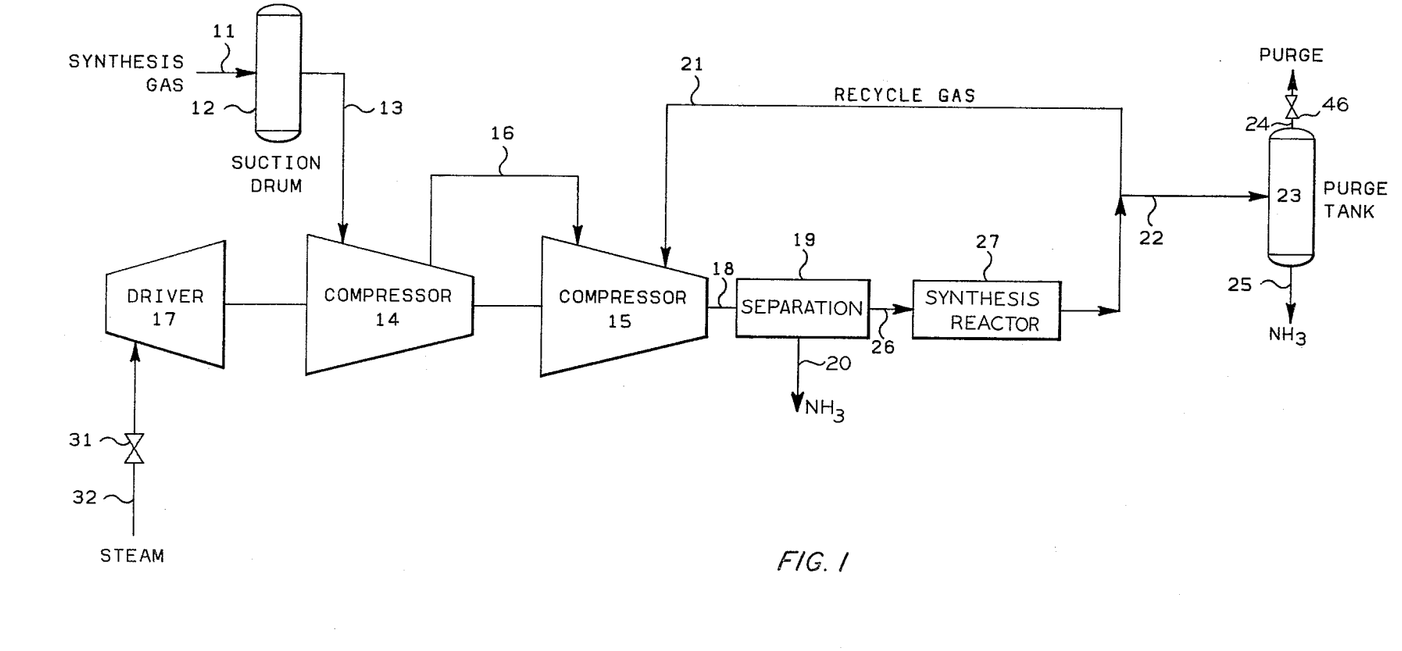
FIG. 1 is a representation of an ammonia synthesis process.

Referring now to FIG. 1, a synthesis gas containing hydrogen and nitrogen in the approximate mol ratio of 3:1 is obtained from any suitable source and fed through synthesis gas conduit means 11 into suction drum 12. From suction drum 12 the fresh synthesis gas is fed through conduit means 13 into first stage compressor 14 and from compressor 14 through conduit means 16 into the second stage compressor 15. This two-stage compression system, which is powered by driver 17, compresses the synthesis gas to a high pressure. Recycle gas is mixed with the synthesis gas in compressor 15 and the compressed mixture is fed through conduit means 18 into the separation chamber 19. The gases are cooled in the separation chamber 19 to condense out the ammonia product as a liquid, which is withdrawn from the process through conduit means 20. The cooled gas is supplied from the separation chamber through conduit means 26 to the ammonia synthesis reactor 27.

All the hydrogen and nitrogen will not be converted to ammonia. The reacted gases and any unreacted gases are withdrawn from the ammonia synthesis reactor 27 and most of the thus withdrawn gases are passed through recycle gas conduit means 21 as recycle gas to be mixed with fresh synthesis gas in compressor 15 and thus passed to the separation chamber 19. The recycle gas will also contain certain gases such as argon and methane which are inert in the reaction of hydrogen and nitrogen to form ammonia. In order to avoid a buildup of these inert gases in the recycle gas to such an extent that their partial pressure effect becomes deleterious to the reaction, a portion of the recyle gas is intermittently or continuously purged from the system through purge gas conduit means 22 into purge tank 23. Purge gas is vented through conduit means 24 and any ammonia condensing out from the purge gas is withdrawn from tank 23 through conduit means 25.

The loop formed by the two-stage compression system 14 and 15, the synthesis reactor 27, the separation zone 19 and conduit means 21 for passing the recycle gas to the second stage of the two-stage compressor system is commonly referred to as the ammonia synthesis loop.

The rate at which steam is delivered to the driver 17 through conduit means 32 determines the speed at which compressor 14 and compressor 15 will be driven. The rate at which steam is provided to the driver 17 is controlled by control valve 31 which is located in steam conduit means 32. Control valve 31 may be manipulated automatically or by hand to provide a desired compressor speed for the ammonia synthesis process.

The purge rate for the recycle gas is controlled by means of control valve 46 which is located in conduit means 24. Control valve means 46 is generally automatically manipulated in response to either the concentration of inerts in the recycle gas or the pressure of recycle gas to provide a desired purge rate for the ammonia synthesis process.

A simplified diagram of the synthesis reactor 27, illustrated in FIG. 1, is set forth in FIG. 2. The control system of the present invention for controlling the temperature profile across the synthesis reactor 27 is also illustrated in FIG. 2. Referring now to FIG. 2, a portion of the feed gas from the separation chamber 19, illustrated in FIG. 1, is provided through conduit means 26 to the heat exchanger 51. The feed gas is provided through conduit means 60 from heat exchanger 51 to the first catalyst bed 52. The feed gas flowing through conduit means 26 is heated by the reacted gas flowing from the fourth catalyst bed 55 through conduit means 73 before being provided to the first catalyst bed 52.

A portion of the feed gas flowing through conduit means 26 is also provided through conduit means 61 to the feed flowing into the first catalyst bed 52 through conduit means 60. The point at which the feed gas flowing through conduit means 60 and the feed gas flowing through conduit means 61, which is referred to as a quench fluid, are combined will be referred to as the first chamber. The feed gas which flows through conduit means 60 and the quench fluid which has been provided through conduit means 61 are provided from the first catalyst bed 52 to the second catalyst bed 53 through conduit means 62.

A portion of the feed gas flowing through conduit means 26 is also provided, as a quench fluid, through conduit means 64 to the effluent from bed 52 flowing through conduit means 62. Conduit means 62 will be referred to as the second quench chamber.

The effluent from the second catalyst bed 53 is provided to the third catalyst bed 54 through conduit means 65 which will be referred to as the third quench chamber. A portion of the feed flowing through conduit means 26 is provided through conduit means 67 as a quench fluid to the third quench chamber.

The effluent flowing from the third catalyst bed 54 is provided to the fourth catalyst bed 55 through conduit means 69 which will be referred to as the fourth quench chamber. A portion of the feed gas flowing through conduit means 26 is provided through conduit means 71 as a quench fluid to the fourth quench chamber. The effluent from the fourth catalyst bed 55, which is a combination of the feed gas which flows through conduit means 26 and the quench fluid which flows through conduit means 61, 64, 67 and 71, is provided to the heat exchanger 51 through conduit means 73. The effluent flowing from the fourth catalyst bed 55 is cooled in the heat exchanger 51 and is provided from the heat exchanger 51 to the recycle gas conduit means 21 as is illustrated in FIG. 1.

As has been previously stated, the primary problem addressed by the present invention is the presence of thermal oscillations in the ammonia synthesis reactor which is illustrated in FIG. 2. These thermal oscillations propagate through the ammonia synthesis reactor and have a destabilizing effect upon the ammonia synthesis reactor unless they are adequately controlled. A measurement of the temperature of the reacted gas flowing through conduit means 21 is readily and quickly available and this temperature measurement can be utilized to provide control of the temperature oscillations in the ammonia synthesis reactor. The magnitude of the temperature oscillations are considerably diminished in the effluent flowing through the conduit means 21 because of the heat loss in heat exchanger 51 but they are of sufficient magnitude to be detectable.

A thermocouple is preferably utilized to measure the temperature of the reacted gas flowing through conduit means 21. The signal 81, which is representative of the temperature of the reacted gas flowing through conduit means 21, is provided from a thermocouple, located in conduit means 21 close to heat exchanger 51, to the temperature transducer 82. The temperature transducer 82 provides an output signal 83 which is also representative of the temperature of the effluent flowing through conduit means 21. Signal 83 is provided to the phase shift element 85 and to the subtracting element 87.

The measurement of the temperature of the reacted gas flowing through conduit means 21 also provides an indication of the frequency of the temperature oscillations in the ammonia synthesis reactor illustrated in FIG. 2. The phase shift element 85 is preferably utilized to provide an output signal 88 which will be approximately 180 degress out of phase with signal 83 at oscillation frequencies close to that of the thermal waves propagating through the ammonia synthesis reactor. Signal 88 is provided from the phase shift element 85 as a second input to the subtracting element 87. Signal 88 is subtracted from signal 83 in the subtracting element 87 to provide a correction signal 91. The correction signal 91 is provided from the subtracting means 87 as a first input to the multiplying element 92.

A constant gain term $K_n$, which is illustrated as signal 93, is provided as a second input to the multiplying element 92. The constant gain term is preferably chosen so as to keep the final corrective term 95, which is provided as an output from the multiplying element 92, as low as possible while still removing thermal oscillations. The final correction signal 95 is provided as a first input to the subtracting means 101-104.

A thermocouple is utilized to provide a measurement signal 111, which is representative of the temperature of the combined feed flowing into the first catalyst bed 52, to the temperature transducer 112. The temperature transducer provides an output signal 113 to the flow controller 114. Signal 113 is representative of the temperature of the combined feed flowing into the first catalyst bed 52. The flow controller 114 is provided with a set point signal 115 which is representative of the desired temperature of the combined feed flowing into the first catalyst bed 52. Signal 113 is compared to signal 115 by the flow controller 114 which outputs a signal 116 which is responsive to the difference between signals 113 and 115. Signal 116 is provided as a second input to the subtracting means 101. Signal 95 is subtracted from signal 116 in the subtracting means 101 to provide an output signal 117 which is provided to the current to pressure transducer 118. Signal 117 is representative of the desired flow rate of the quench fluid flowing through conduit means 61. Signal 119, which is also representative of the desired flow rate of the fluid flowing through conduit means 61, is provided from the current to pressure transducer 118 as a control signal to the pneumatic control valve 120 which is operably located in conduit means 61. The pneumatic control valve 120 is manipulated in response to the control signal 119 to thereby control the flow rate of the quench fluid flowing through conduit means 61 to the first quench zone.

A thermocouple is utilized to provide a measurement signal 121, which is representative of the temperature of the combined feed flowing into the second catalyst bed 53, to the temperature transducer 122. The temperature transducer provides an output signal 123 to the flow controller 124. Signal 123 is also representative of the temperature of the combined feed flowing into the second catalyst bed 53. The flow controller 124 is provided with a set point signal 125 which is representative of the desired temperature of the combined feed flowing into the second catalyst bed 53. Signal 123 is compared to signal 125 by the flow controller 124 which outputs a signal 126 which is responsive to the difference between signals 123 and 125. Signal 126 is provided as a second input to the subtracting means 102. Signal 95 is subtracted from signal 126 in the subtracting means 102 to provide an output signal 127 which is provided to the current to pressure transducer 128. Signal 127 is representative of the desired flow rate of the quench fluid flowing through conduit means 64. Signal 129, which is also representative of the desired flow rate of the fluid flowing through conduit means 64, is provided from the current to pressure transducer 128 as a control signal to the pneumatic control valve 130 which is operably located in conduit means 64. The pneumatic control valve 130 is manipulated in response to the control signal 129 to thereby control the flow rate of the quench fluid flowing through conduit means 64 to the second quench zone.

A thermocouple is utilized to provide a measurement signal 131, which is representative of the temperature of the combined feed flowing into the third catalyst bed 54, to the temperature transducer 132. The temperature transducer provides an output signal 133 to the flow controller 134. Signal 133 is also representative of the temperature of the combined feed flowing into the third catalyst bed 54. The flow controller 134 is provided with a set point signal 135 which is representative of the desired temperature of the combined feed flowing into the third catalyst bed 54. Signal 133 is compared to signal 135 by the flow controller 134 which outputs a signal 136 which is responsive to the difference between signals 133 and 135. Signal 136 is provided as a second input to the subtracting means 103. Signal 95 is subtracted from signal 136 in the subtracting means 103 to provide an output signal 137 which is provided to the current to pressure transducer 138. Signal 137 is representative of the desired flow rate of the quench fluid flowing through conduit means 67. Signal 139, which is also representative of the desired flow rate of the fluid flowing through conduit means 67, is provided from the current to pressure transducer 138 as a control signal to the pneumatic control valve 140 which is operably located in conduit means 67. The pneumatic control valve 140 is manipulated in response to the control signal 139 to thereby control the flow rate of the quench fluid flowing through conduit means 67 to the third quench zone.

A thermocouple is utilized to provide a measurement signal 141, which is representative of the temperature of the combined feed flowing into the fourth catalyst bed 55, to the temperature transducer 142. The temperature transducer provides an output signal 143 to the flow controller 144. Signal 143 is also representative of the temperature of the effluent combined feed flowing into the fourth catalyst bed 55. The flow controller 144 is provided with a set point signal 145 which is representative of the desired temperature of the combined feed flowing into the fourth catalyst bed 55. Signal 143 is compared to signal 145 by the flow controller 144 which outputs a signal 146 which is responsive to the difference between signals 143 and 145. Signal 146 is provided as a second input to the subtracting means 104. Signal 95 is subtracted from signal 146 in the subtracting means 104 to provide an output signal 147 which is provided to the current to pressure transducer 148. Signal 147 is representative of the desired flow rate of the quench fluid flowing through conduit means 71. Signal 149, which is also representative of the disired flow rate of the fluid flowing through conduit means 71, is provided from the current to pressure transducer 148 as a control signal to the pneumatic control valve 150 which is operably located in conduit means 71. The pneumatic control valve 150 is manipulated in response to the control signal 149 to thereby control the flow rate of the quench fluid flowing through conduit means 71 to the fourth quench zone.

The phase shift element 85 operates to introduce a phase lag or a dead time into the temperature measurement signal 83 such that signal 88 is 180 degrees out of phase with signal 83. In this manner, when signal 83 is increasing, indicating that the temperature of the reactant gases flowing to conduit means 26 is increasing, the shifted temperature signal 88 will be decreasing. In like manner when the measure temperature signal 83 is decreasing the shifted temperature signal 88 will be increasing. Signal 88 is subtracted from signal 83 to provide the initial correction signal 91. Signal 91 is effectively an indication of what must be done to damp out thermal oscillations in the ammonia synthesis reactor.

The constant $K_n$, which is supplied as signal 93 to the multiplying unit 92, is utilized to provide a final correction term, having a desired magnitude, to the subtracting means 101–104. The constant term $K_n$ is selected preferably so as to keep the corrective term represented by signal 95 as low as possible while still removing thermal oscillations in the synthesis reactor. A value for the constant $K_n$ may be determined by watching the value of the initial correction signal 91 and the ammonia synthesis reactor outlet temperature which is represented by signal 83. The constant $K_n$ is changed while the magnitude of signal 91 is monitored and the thermal oscillations in the ammonia synthesis are monitored by means of signal 83. The more quickly signal 91 goes to zero while still removing the thermal oscillations which are seen by means of signal 83 the better the value selected for $K_n$ is becoming. In this manner a constant $K_n$ can be selected which will keep the corrective term as low as possible while still removing thermal oscillations in the ammonia synthesis reactor. This results in operation of the ammonia synthesis reactor in an optimum manner without altering the characteristics of the ammonia synthesis reactor.

If there are no thermal oscillations in the ammonia synthesis reactor the correction term represented by signal 95 will be zero and the pneumatic control valves 120, 130, 140 and 150 will be controlled in response to the output signals 116, 126, 136 and 146 from controllers 114, 124, 134 and 144 respectively. If a change occurs, such as a feed rate change to the ammonia synthesis reactor, and there are still no thermal oscillations then the corrective term represented by signal 95 will go to zero after one delay period, where the delay period is defined as the delay or phase lag which will make signal 88 approximately 180 degrees out of phase with signal 83 at the frequency at which thermal oscillations would normally occur. If there are thermal oscillations present in the ammonia synthesis reactor, then the correction term 95 is a continuous output signal which is varied so as to provide a dampening effect for the thermal oscillations occuring in the ammonia synthesis reactor with minimal alteration of the characteristics and response of the ammonia synthesis reactor.

The estimation of the temperature oscillation period is not critical. It is desirable that signal 88 be approximately 180 degrees out of phase with signal 83 but it is not necessary that signal 88 be exactly 180 degrees out of phase with signal 83.

The constant $K_n$ is preferably less than 1 with a value of 0.5 being presently preferred when a proportional constant of 0.7 is utilized for the flow controllers 114, 124, 134 and 144.

The invention has been described in terms of a preferred embodiment as is illustrated in FIGS. 1 and 2. Specific components which can be used in the practice of the invention, as illustrated in FIGS. 1 and 2, such as control valves 31 and 36; temperature transducers 82, 112, 122, 132 and 142; flow controllers 114, 124, 134 and 44; current-to-pressure transducers 118, 128, 138 and 148; and pneumatic control valves 120, 130, 140 and 150 are each well known, commercially available control components such as are described at length in Perry's Chemical Engineers Handbook, 4th Edition, Chapter 22, McGraw-Hill.

The subtracting elements 101-104 and 87, multiplying element 92 and phase shift element 85 may be easily implemented on a digital computer. These elements may also be implemented on an analog computer with a first order Pade dead time element being used for the phase shift element 85 and with a No. B05885 Multiuse Amp manufactured by Applied Automation Inc., Bartlesville, Oklahoma being used for the subtracting elements and the multiplying element.

For reasons of brevity conventional auxiliary equipment such as pumps, heat exchangers, additional measurement-control devices, etc. have not been included in the above description as they play no part in the explanation of the invention.

While the invention has been described in terms of the presently preferred embodiment, reasonable variations and modifications are possible by those skilled in the art, within the scope of the described invention and the appended claims.

That which is claimed is:

1. In a process of operating a quench type ammonia synthesis reactor wherein the temperature in at least one quench zone of said quench type ammonia synthesis reactor is maintained at a respective desired temperature by measuring the temperature in said at least one quench zone and comparing the measured temperature to the respective desired temperature in said at least one quench zone to thereby establish a first signal responsive to said comparison, the flow of quench fluid to said at least one quench zone being manipulated in response to said first signal to thereby control the temperature in said at least one quench zone, the improvement comprising the steps of:

establishing a second signal representative of the temperature of the reaction effluent flowing from said quench type ammonia synthesis reactor;

phase shifting said second signal so as to produce a third signal which is approximately 180 degrees out of phase with said second signal at the approximate frequency of the thermal oscillations in said quench type ammonia synthesis reactor;

comparing said second signal and said third signal and generating a fourth signal responsive to the difference between said second signal and said third signal; and utilizing said fourth signal to modify said first signal to thereby dampen said thermal oscillations in said quench type ammonia synthesis reactor.

2. A method in accordance with claim 1 wherein said step of comparing said second signal and said third signal comprises subtracting said third signal from said second signal.

3. A method in accordance with claim 1 additionally comprising the steps of:

establishing a fifth signal representative of a constant $K_n$; and utilizing said fifth signal to modify said fourth signal, the value of said fifth signal being chosen so as to keep said fourth signal at a substantially minimum value while still dampening said thermal oscillations in said quench type ammonia synthesis reactor.

4. A method in accordance with claim 3 wherein said step of utilizing said fifth signal to modify said fourth signal comprises multiplying said fourth signal by said fifth signal.

5. A method in accordance with claim 1 wherein said step of utilizing said fourth signal to modify said first signal comprises subtracting said fourth signal from said first signal.

6. In a process of operating a quench type ammonia synthesis reactor wherein a first stream of synthesis gas containing hydrogen and nitrogen is supplied through a heat exchange zone and a first quench zone to a first reaction zone, the reaction effluent from said first reaction zone being supplied through a second quench zone to a second reaction zone, the reaction effluent from said second reaction zone being supplied through a third quench zone to a third reaction zone, the reaction effluent from said third reaction zone being supplied through a fourth quench zone to a fourth reaction zone, and the reaction effluent from said fourth reaction zone being supplied through said heat exchange zone to a separation zone to therein separate the ammonia contained in the reaction effluent flowing from said fourth reaction zone from any unreacted synthesis gas;

wherein a second stream of synthesis gas is supplied to said first quench zone as a quench fluid, a third stream of synthesis gas is supplied to said second quench zone as a quench fluid, a fourth stream of synthesis gas is supplied to said third quench zone as a quench fluid, and a fifth stream of synthesis gas is supplied to said fourth quench zone as a quench fluid;

wherein the temperature in said first quench zone of said quench type ammonia synthesis reactor is maintained at a first desired temperature by measuring the temperature in said first quench zone and comparing the measured temperature to said first desired temperature to thereby establish a first signal responsive to the comparison, the flow of said second stream of synthesis gas to said first quench zone being manipulated in response to said first signal to thereby manipulate the temperature in said first quench zone;

wherein the temperature in said second quench zone of said quench type ammonia synthesis reactor is maintained at a second desired temperature by measuring the temperature in said second quench zone and comparing the measured temperature to said second desired temperature to thereby establish a second signal responsive to the comparison, the flow of said third stream of synthesis gas to said second quench zone being manipulated in response to said second signal to thereby manipulate the temperature in said second quench zone;

wherein the temperature in said third quench zone of said quench type ammonia synthesis reactor is maintained at a third desired temperature by measuring the temperature in said third quench zone and comparing the measured temperature to said third desired temperature to thereby establish a third signal responsive to the comparison, the flow of said fourth stream of synthesis gas to said third quench zone being manipulated in response to said third signal to thereby manipulate the temperature in said third quench zone; and wherein the temperature in said fourth quench zone of said quench type ammonia synthesis reactor is maintained at a fourth desired temperature by measuring the temperature in said fourth quench zone and comparing the measured temperature to said fourth desired temperature to thereby establish a fourth signal responsive to the comparison, the flow of said fifth stream of synthesis gas to said fourth quench zone being manipulated in response to said fourth signal to thereby manipulate the temperature in said fourth quench zone; the improvement comprising the steps of:

establishing a fifth signal representative of the temperature of the reaction effluent flowing from said heat exchange zone to said separation zone;

phase shifting said fifth signal so as to produce a sixth signal which is approximately 180 degrees out of phase with said fifth signal at the approximate frequency of the thermal oscillations in said quench type ammonia synthesis reactor;

comparing said fifth signal and said sixth signal and generating a seventh signal responsive to the difference between said fifth signal and said sixth signal; and utilizing said seventh signal to modify said first signal, said second signal, said third signal and said fourth signal to thereby dampen said thermal oscillations in said quench type ammonia synthesis reactor.

7. A method in accordance with claim 6 wherein said step of comparing said fifth signal and said sixth signal comprises subtracting said sixth signal from said fifth signal.

8. A method in accordance with claim 6 additionally comprising the steps of:

establishing an eighth signal representative of a constant $K_n$; and utilizing said eighth signal to modify said seventh signal, the value of said eighth signal being chosen so as to keep said seventh signal at a substantially minimum value while still dampening said thermal oscillations in said quench type ammonia synthesis reactor.

9. A method in accordance with claim 8 wherein said step of utilizing said eighth signal to modify said seventh signal comprises multiplying said seventh signal by said eighth signal.

10. A method in accordance with claim 6 wherein said step of utilizing said seventh signal to modify said first signal, said second signal, said third signal and said fourth signal comprises subtracting said seventh signal from said first signal, said second signal, said third signal and said fourth signal.

11. An apparatus for manufacturing ammonia comprising:

a quench type ammonia synthesis reactor means for producing ammonia from synthesis gas, said quench type ammonia synthesis reactor means comprising at least one catalyst bed and at least one quench chamber;

means for passing a first stream of synthesis gas containing hydrogen and nitrogen through said at least one quench chamber to said at least one catalyst bed of said quench type ammonia synthesis reactor means to therein form ammonia in said at least one catalyst bed;

means for passing a second stream of synthesis gas as a quench fluid to said at least one quench chamber of said quench type ammonia synthesis reactor means to thereby control the temperature of the combined synthesis gas stream flowing to said at least one catalyst bed, said combined synthesis gas stream being made up of said first stream of synthesis gas and said second stream of synthesis gas;

a separation means;

means for passing said ammonia and any unreacted synthesis gas from said at least one catalyst bed in said quench type ammonia synthesis reactor means to said separating means to thereby separate said ammonia from any unreacted synthesis gas;

means for establishing a first signal representative of the temperature of said combined synthesis gas stream;

means for establishing a second signal representative of the respective desired temperature of said combined synthesis gas stream;

means for comparing said first signal and said second signal and for establishing a third signal responsive to the difference between said first signal and said second signal; and means for manipulating the flow of said quench fluid to said at least one quench zone of said quench type ammonia synthesis reactor in response to said third signal; the improvement comprising;

means for establishing a fourth signal representative of the temperature of said ammonia and any unreacted synthesis gas passing from said at least one catalyst bed of said quench type ammonia synthesis reactor means to said separating means;

phase shifting means;

means for supplying said fourth signal to said phase shifting means, said phase shifting means supplying a fifth signal as an output signal, said fifth signal being approximately 180 degrees out of phase with said fourth signal at the approximate frequency of the thermal oscillations in said quench type ammonia synthesis reactor means;

means for comparing said fourth signal and said fifth signal and for establishing a sixth signal responsive to the difference between said fourth signal and said fifth signal; and means for utilizing said sixth signal to modify said third signal to thereby dampen said thermal oscillations in said quench type ammonia synthesis reactor means.

12. Apparatus in accordance with claim 11 wherein said means for comparing said fourth signal and said fifth signal comprises means for subtracting said fifth signal from said fourth signal.

13. Apparatus in accordance with claim 11 additionally comprising:

means for establishing a seventh signal representative of a constant $K_n$; and means for utilizing said seventh signal to modify said sixth signal, the value of said seventh signal being chosen so as to keep said sixth signal at a substantially minimum value while still dampening said thermal oscillations in said quench type ammonia synthesis reactor means.

14. Apparatus in accordance with claim 13 wherein said means for utilizing said seventh signal to modify said sixth signal comprises means for multiplying said sixth signal by said seventh signal.

15. Apparatus in accordance with claim 11 wherein said means for utilizing said sixth signal to modify said third signal comprises means for subtracting said sixth signal from said third signal.

16. An apparatus for manufacturing ammonia comprising:

a first catalyst bed;

a first quench chamber;
a heat exchange means;
means for supplying a first stream of synthesis gas, containing hydrogen and nitrogen, through said heat exchange means to said first quench chamber;
means for passing a second stream of synthesis gas as a quench fluid to said first quench chamber;
means for passing a first combined synthesis gas stream from said first quench chamber to said first catalyst bed, said first combined synthesis gas stream being made up of said first stream of synthesis gas and said second stream of synthesis gas;
a second quench chamber;
a second catalyst bed;
means for supplying the reaction effluent from said first catalyst bed to said second quench chamber;
means for passing a third stream of synthesis gas as a quench fluid to said second quench chamber;
means for passing a second combined synthesis gas stream from said second quench chamber to said second catalyst bed, said second combined synthesis gas stream being made up of the reaction effluent flowing from said first catalyst bed and said third stream of synthesis gas;
a third quench chamber;
a third catalyst bed;
means for supplying the reaction effluent from said second catalyst bed to said third quench chamber;
means for passing a fourth stream of synthesis gas as a quench fluid to said third quench chamber;
means for passing a third combined synthesis gas stream from said third quench chamber to said third catalyst bed, said third combined synthesis gas stream being made up of the reaction effluent flowing from said second catalyst bed and said fourth stream of synthesis gas;
a fourth quench chamber;
a fourth catalyst bed, said first, second, third and fourth quench chambers and said first second, third and fourth catalyst beds comprising a quench type ammonia synthesis reactor;
means for passing the reaction effluent from said third catalyst bed to said fourth quench chamber;
means for passing a fifth stream of synthesis gas as a quench fluid to said fourth quench chamber;
means for passing a fourth combined synthesis gas stream from said fourth quench chamber to said fourth catalyst bed, said fourth combined synthesis gas stream being made up of the reaction effluent flowing from said third catalyst bed and said fifth stream of synthesis gas;
a separation means;
means for passing the reaction effluent from said fourth catalyst bed which will contain ammonia and any unreacted synthesis gas, from said fourth catalyst bed through said heat exchange means to said separation means to therein separate said ammonia from any unreacted synthesis gas;
means for establishing a first signal representative of the temperature of said first combined synthesis gas stream;
means for establishing a second signal representative of the desired temperature of said first combined synthesis gas stream;
means for comparing said first signal and said second signal and for establishing a third signal responsive to the difference between said first signal and said second signal;
means for manipulating, responsive to said third signal, the flow of said second synthesis gas stream to said first quench chamber to thereby control the temperature of said first combined synthesis gas stream;
means for establishing a fourth signal representative of the temperature of said second combined synthesis gas stream;
means for establishing a fifth signal representative of the desired temperature of said second combined synthesis gas stream;
means for comparing said fourth signal and said fifth signal and for establishing a sixth signal responsive to the difference between said fourth signal and said fifth signal;
means for manipulating, responsive to said sixth signal, the flow of said third synthesis gas stream to said second quench zone to thereby control the temperature of said second combined synthesis gas stream;
means for establishing a seventh signal representative of the temperature of said third combined synthesis gas stream;
means for establishing an eighth signal representative of the desired temperature of said third combined synthesis gas stream;
means for comparing said seventh signal and said eighth signal and for establishing a ninth signal responsive to the difference between said seventh signal and said eighth signal;
means for manipulating, responsive to said ninth signal, the flow of said fourth synthesis gas stream to said third quench chamber to thereby control the temperature of said third combined synthesis gas stream;
means for establishing a tenth signal representative of the temperature of said fourth combined synthesis gas stream;
means for establishing an eleventh signal representative of the desired temperature of said fourth combined synthesis gas stream;
means for comparing said tenth signal and said eleventh signal and for establishing a twelfth signal responsive to the difference between said tenth signal and said eleventh signal; and
means for manipulating, responsive to said twelfth signal, the flow of said fifth synthesis gas stream to said fourth quench zone to thereby control the temperature of said fourth combined synthesis gas stream; the improvement comprising:
means for establishing a thirteenth signal representative of the temperature of the reaction effluent passing from said heat exchange means to said separation means;
phase shifting means;
means for supplying said thirteenth signal to said phase shifting means, said phase shifting means supplying a fourteenth signal as an output signal, said fourteenth signal being approximately 180 degrees out of phase with said thirteenth signal at the approximate frequency of the thermal oscillations in said quench type ammonia synthesis reactor means;
means for comparing said thirteenth signal and said fourteenth signal and for establishing a fifteenth signal responsive to the difference between said thirteenth signal and said fourteenth signal; and means for utilizing said fifteenth signal to modify said third signal, said sixth signal, said ninth signal, and said twelfth signal to thereby dampen thermal oscillations in said quench type ammonia synthesis reactor means.

17. Apparatus in accordance with claim 16 wherein said means for comparing said thirteenth signal and said fourteenth signal comprises means for subtracting said fourteenth signal from said thirteenth signal.

18. Apparatus in accordance with claim 16 additionally comprising:

means for establishing a sixteenth signal representative of a constant $K_n$; and means for utilizing said sixteenth signal to modify said fifteenth signal, the value of said sixteenth signal being chosen so as to keep said fifteenth signal at a substantially minimum value while still dampening said thermal oscillations in said quench type ammonia synthesis reactor.

19. Apparatus in accordance with claim 18 wherein said means for utilizing said sixteenth signal to modify said fifteenth signal comprises means for multiplying said fifteenth signal by said sixteenth signal.

20. Apparatus in accordance with claim 16 wherein said means for utilizing said fifteenth signal to modify said third signal, said sixth signal, said ninth signal and said twelfth signal comprises means for subtracting said fifteenth signal from said third signal, said sixth signal, said ninth signal and said twelfth signal.

* * * * *